United States Patent Office 3,193,929
Patented July 13, 1965

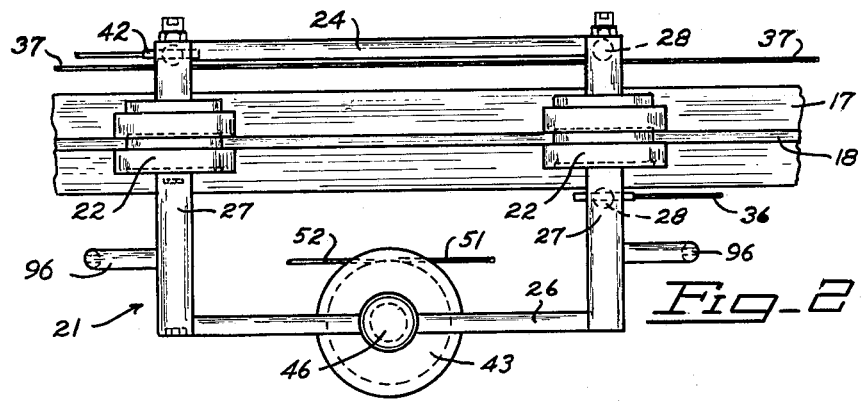
Fig-2
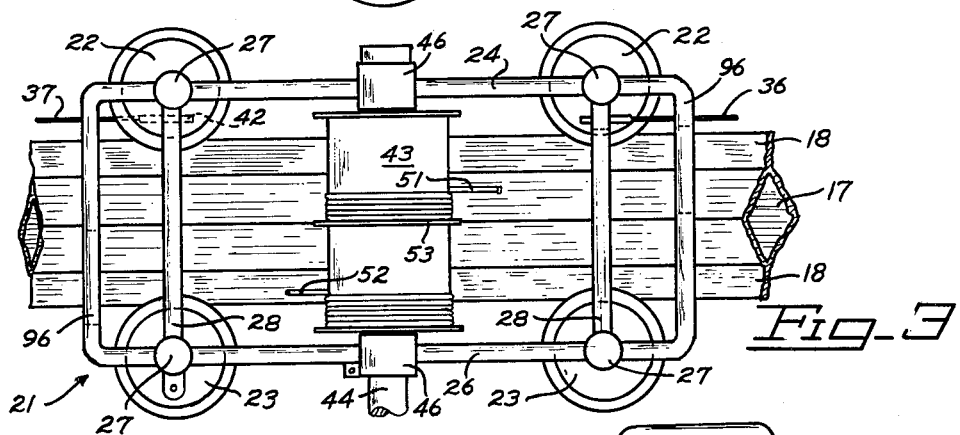
Fig-3
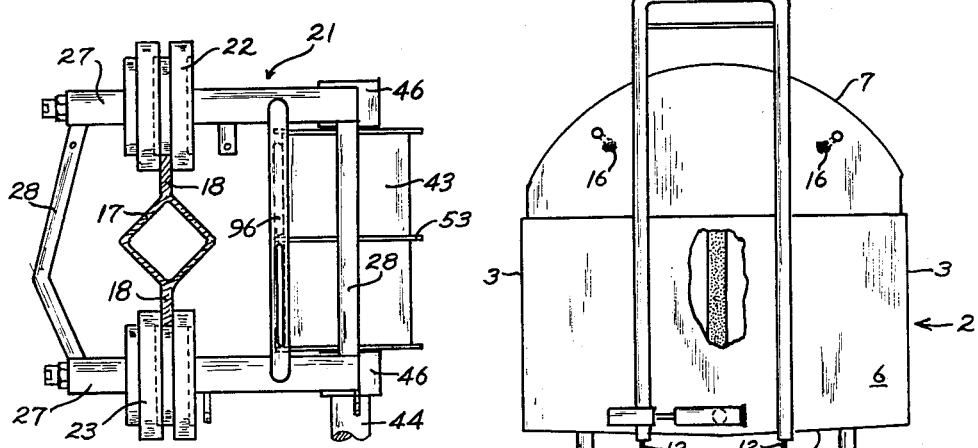
Fig-4
Fig-1B
INVENTOR.
LOWELL J. COLLINS
BY John J. Leavitt July 13, 1965 L. J. COLLINS 3,193,929
APPARATUS FOR AGITATING THE CURD OF COTTAGE CHEESE
DURING THE MANUFACTURING PROCESS
Filed June 17, 1964 4 Sheets-Sheet 3
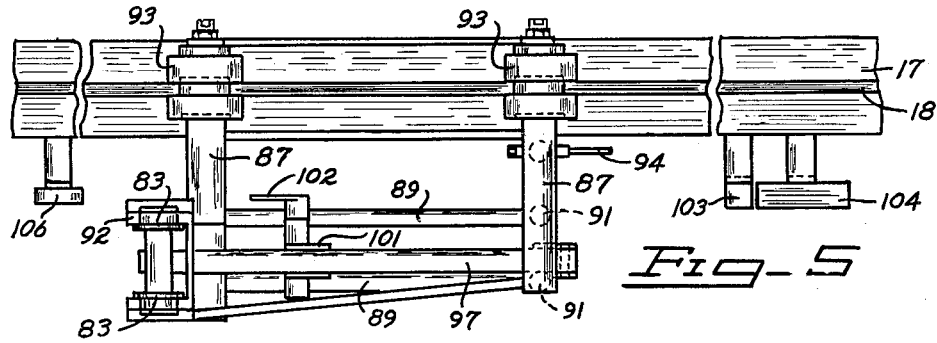
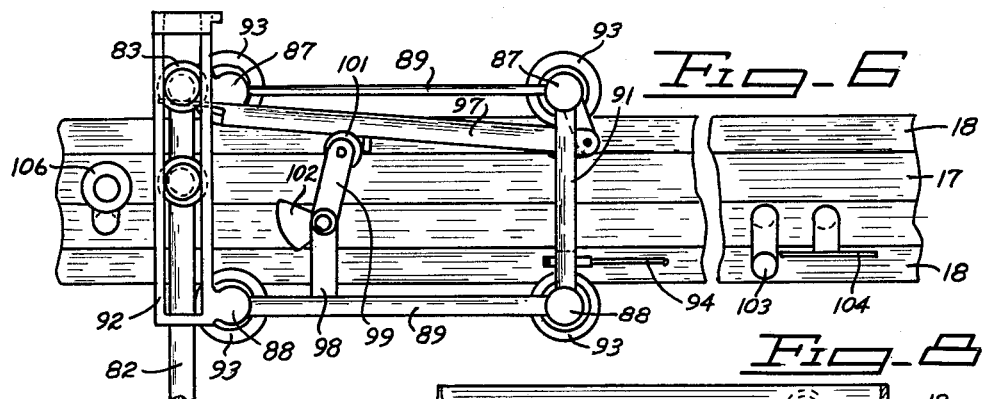
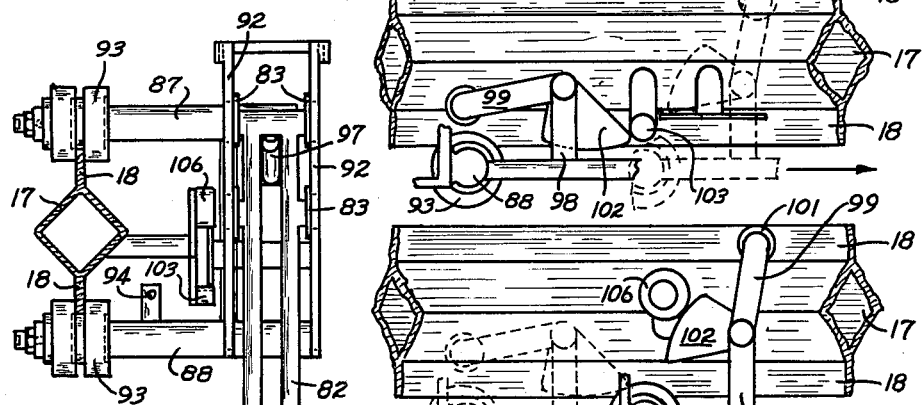
INVENTOR.
LOWELL J. COLLINS
BY

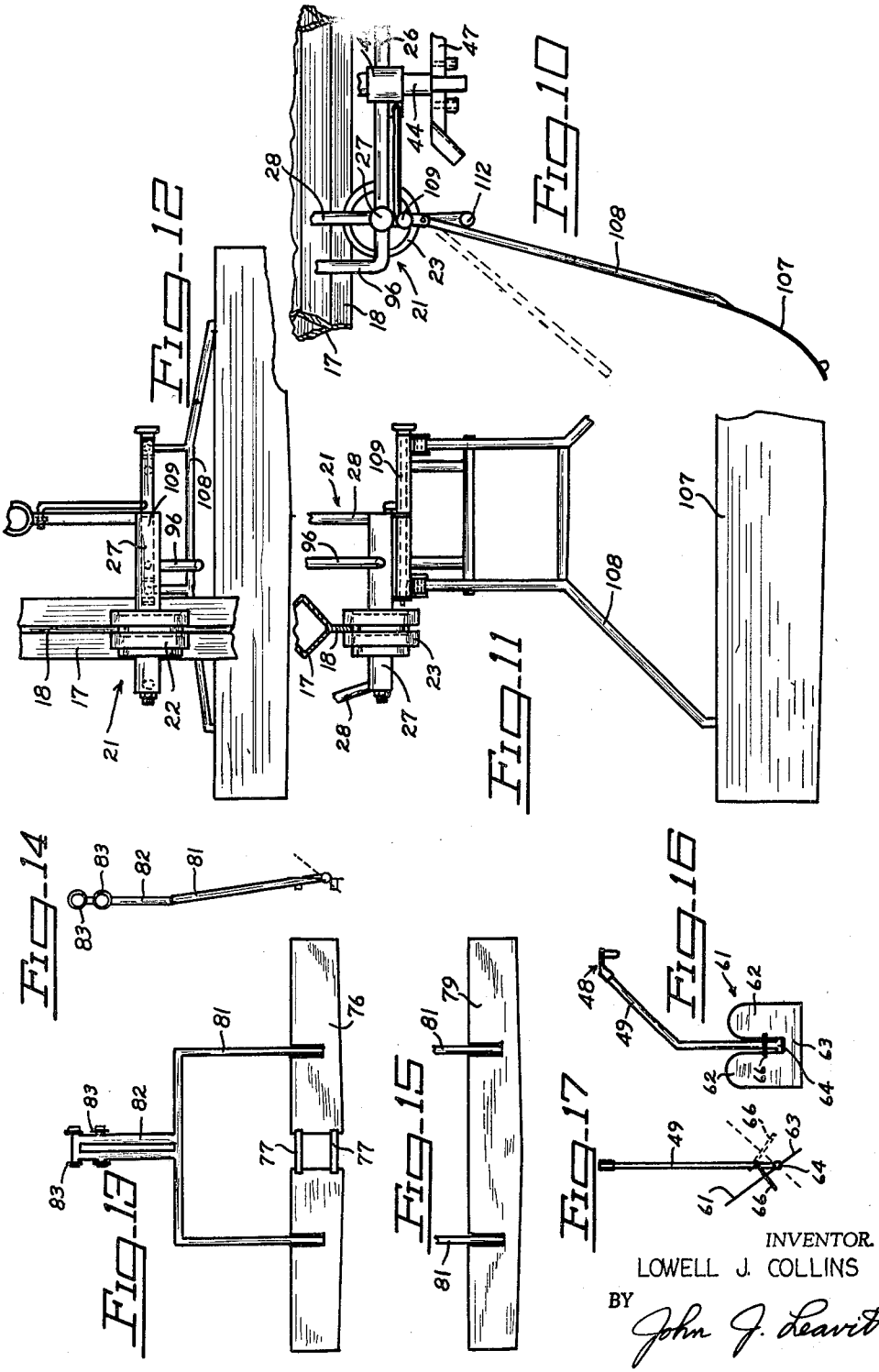

3,193,929
APPARATUS FOR AGITATING THE CURD OF COTTAGE CHEESE DURING THE MANUFACTURING PROCESS
Lowell J. Collins, Piedmont, Calif.
(936 61st St., Oakland, Calif.)
Filed June 17, 1964, Ser. No. 375,701
12 Claims. (Cl. 31—48)

The invention relates to the manufacture of cottage cheese and other cheese products; and particularly to a novel method and apparatus for agitating the ingredients in a cheese vat during the setting, cooking, and washing of the curd.

The manufacture of cottage cheese and other cheeses for the commercial market entails two problems difficult of solution but necessary to economic manufacture and marketing of this food product in a wholesome condition.

The first problem is to prevent spoilage organisms and bacteria from infiltrating the ingredients. Cottage cheese is an ideal media for spoilage growth which changes the flavor of the cheese and causes it to become unfit for human consumption and therefore unsaleable. Such spoilage can occur in a relatively short period of time.

Secondly, manufacture of cottage cheese is further complicated by the large volume of ingredients required to be processed at one time for economic reasons. As much as 2500 gallons or more of pasteurized fresh skim milk, starter and coagulator to initiate the curding of the milk is processed in a single vat. To contain such a large volume of ingredients requires a vast of approximately 5' wide, 23' long and 34" deep. A sterile vat and related equipment is the ideal apparatus, especially if the vat has a sealed cover, to exclude the bacteria normally present in the atmosphere, as well as to exclude organisms exhaled by the cheesemaker and released from his clothing. It is the cheese with the lowest spoilage count that has the best flavor and the longest shelf life. A covered vat presents difficult problems of design and manufacture because processing of curd requires a mechanism that will operate beneath a cover and be free of oil drip and free of electric motors, and which can be easily cleaned and sterilized in place. Additionally, it must be made of materials impervious to cleansing agents. Conventional agitating mechanisms cannot be sanitized in place, and it is therefore one of the objects of the invention to provide an apparatus for agitating the ingredients of a cheese vat and which can be cleaned or sanitized in place.

Another object of the invention is to provide an apparatus which will agitate all the ingredients in the vat and not just part thereof.

Conventional cheese vats are rectangular in shape to facilitate cutting of the curd. Conventional agitators all have the paddles revolving one way in a circular path. This action sweeps the ingredients into corners where it lodges until it is manually moved by a cheesemaker paddle. Accordingly, it is an important object of the invention to provide an apparatus for manufacturing cheese in which wholly automatic means are sealed within the vat to agitate the entire body of ingredients in every area of the vat so as to provide a saving of hours of labor through elimination of manual agitation.

A still further object of the invention is to provide a cheese manufacturing apparatus with improved mixing efficiency, improved heat transfer efficiency and which provides a thoroughness of ingredient movement without manual agitation.

Agitation of a large volume of ingredients such as indicated herein poses a problem because of the tendency for the body of ingredients to flow in the direction of movement of the agitating apparatus instead of flowing turbulently in all directions so as to effect uniform mixing, uniform heat transfer and uniform cooking. Accordingly, another object of the invention is the provision in an apparatus for manufacturing cheese of a method of agitation of a large volume of ingredients in a manner to insure a turbulent admixture of all portions of the ingredients filling the vat while preventing over-cooking or matting of the curd on the heat transfer surfaces.

Still another object of the invention is the provision of an agitating and mixing assembly for a cottage cheese manufacturing machine wherein a reversible rotary motion cooperates with a rectilinear motion to thoroughly admix the ingredients of the vat during the setting period, the cooking period and the washing period of the curd forming process.

Another important object is the provision of a cheese processing apparatus which will operate within a closed and sealed vessel so as to control spoilage of the cheese by bacterial infiltration.

A still further object of the invention is the provision of an agitating and mixing apparatus in which the agitating mechanism may be easily cleaned and sanitized while in position on the machine and even while operating, and which may also be readily detached from the machine for repair or manual cleaning.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

Briefly, the agitating and mixing apparatus of the invention comprises a plurality of carriages movably supported in spaced relation above a vat adapted to receive the many gallons of milk for transformation into the curd from which cottage cheese is produced. The carriages comprise one main and two auxiliary carriages, each of which is equipped with a paddle or agitator assembly depending from the carriage into the vat. Means are provided for effecting translation of the main carriage from adjacent one end of the vat to adjacent the other end thereof so as to actuate a rotary actuator from which the associated paddle assembly depends. Near the extremities of its excursion from one end of the vat to the other, the main carriage engages one of the auxiliary carriages to effect translation of the auxiliary carriage within predetermined limits. Means are provided interconnecting the two remote auxiliary carriages to effect simultaneous translation of these carriages together with their paddle assemblies when one of them is engaged by the main carriage. Means are also provided interposed between the main carriage and the support therefor effecting rotary movement of the paddle assembly depending therefrom upon axial translation of the main carriage over the vat.

Referring to the drawings:

FIG. 2 is a fragmentary plan view of the main carriage assembly.

FIG. 3 is a fragmentary side elevational view of the main carriage assembly.

FIG. 4 is an end view of the main carriage assembly shown in FIG. 3.

FIG. 5 is a fragmentary plan view of one of the auxiliary carriage assemblies shown mounted on the support beam and supporting a terminal agitator assembly.

FIG. 6 is a fragmentary side elevation of the auxiliary carriage assembly illustrated in FIG. 5 and showing the rollable interconnection between the auxiliary carriage and the terminal agitator assembly.

FIG. 7 is an end view of the auxiliary carriage assembly shown in FIG. 6.

FIG. 8 is a fragmentary side elevation of the terminal agitator assembly elevating means on the auxiliary carriage shown in full lines moving to the right in the direction of the arrow just prior to commencement of elevation of the agitator assembly and in dotted lines showing the elevating means in elevated and locked position.

FIG. 9 is a fragmentary side elevation of the terminal agitator assembly elevating mechanism shown in full lines in its position just prior to tripping of the mechanism to lower the agitator assembly by movement of the auxiliary carriage to the left in the direction of the arrow.

FIG. 10 is a fragmentary side elevation of a modified embodiment of the main carriage illustrating attachment of a pusher paddle assembly.

FIG. 11 is a fragmentary end elevation of the pusher paddle assembly shown in FIG. 10.

FIG. 12 is a fragmentary plan view of the pusher paddle assembly shown in FIG. 10.

FIG. 13 is a side elevation of the terminal agitator assembly shown at the left end of FIG. 1 apart from the auxiliary carriage.

FIG. 14 is an end elevation of the terminal agitator assembly shown in FIG. 13.

FIG. 15 is a side elevation of the terminal agitator paddle shown at the right in FIG. 1.

FIG. 16 is a side elevation of one of the main agitator paddles shown apart from the main carriage.

FIG. 17 is an end elevation of the main agitator paddle shown in FIG. 16.

FIG. 18 is an end elevation of the entire apparatus as shown in FIG. 1.

Figure 1:
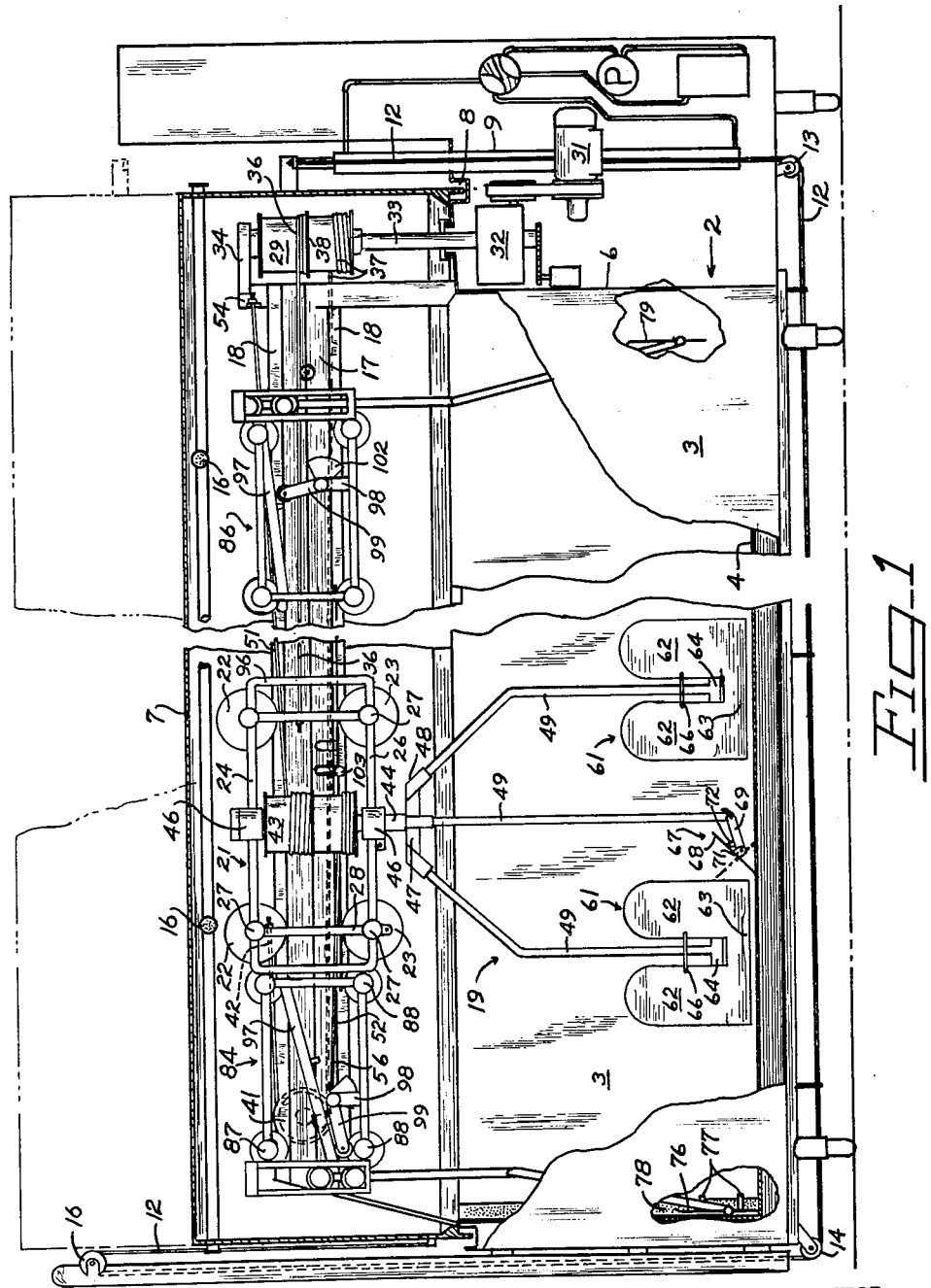
FIG. 1 is a side elevation of the entire apparatus. Portions of the structure are broken away to disclose the underlying parts.

In terms of greater detail the curd processing apparatus of the invention constitutes an improvement over the apparatus disclosed and claimed in my copending application Serial No. 245,002, filed December 17, 1962, and comprises a vat 2 having sides 3, bottom 4, ends 6 and a cover 7 adapted to sealingly seat in a peripheral groove 8 on the vat. In use, a sealing fluid, preferably chlorinated water fills the groove and the interior of the vat is maintained under the slight pressure of a controlled atmosphere. The cover or hood 7 is raised and lowered by a hydraulic ram 9 acting through parallel cables or chains 12 at each end of the vat, or a pair of chains at one end of the vat and a single chain at the other end of the vat, a rod 12′ connecting the cables or chains and appropriate sheaves or sprockets 13, 14 and 15, to raise the hood uniformly at both ends. Appropriate spray nozzles 16 are provided within the hood to effect pressurized fluid-cleaning and sterilization of the interior of the hood and vat together with the improved agitating mechanisms therewithin which will now be described in detail.

Extending longitudinally over the vat and rigidly supported at opposite ends thereon is a beam 17 having a rectangular cross-section as shown arranged with its vertices in horizontal and vertical planes. Flanges 18, integral with the beam, extend vertically from top and bottom as shown.

Agitation of the large body of ingredients is effected principally by a main agitator assembly designated generally by the numeral 19 (FIG. 1) and detachably suspended below a main carriage 21 rollably mounted on the beam by upper and lower pairs of two-part wheels 22 and 23, respectively, adapted to rollably and resiliently clamp on beam flanges 18. The main carriage comprises an open frame made up of round bar stringers 24 and 26 connecting the wheels 22 and 23, respectively, of each pair. Appropriate axle assemblies 27 are provided to journal each two-part wheel, and vertical bars 28 connect corresponding ends of the axle assemblies to form a composite rigid main carriage frame.

Longitudinal translation of the main carriage along the beam is effected by a drive drum 29 shown best at the right of FIG. 1, driven by a reversing motor 31 through an appropriate gear reduction mechanism 32 and shaft 33, the other end of which is journaled in a bearing bracket 34 fixed on the associated end of the beam. Interconnection of the main carriage and drive drum is effected by two cables 36 and 37, each having one end attached to the drive drum and its other end attached to one end of the main carriage.

As shown best in FIG. 1, the cable 36 is attached to a flange 38 fixed midway between the ends of the drum so that upon counterclockwise rotation of the drum as viewed from above in FIG. 1 the cable 36 will wind onto the upper half of the drum and will draw the main carriage to the right toward the drive drum by virtue of its connection to the adjacent end of the main carriage as shown. Simultaneously, the cable 37, because it is secured to the lower end flange of the drum and wound thereon in opposite direction, will unwind, thus permitting the main carriage to move toward the drive drum. It should be noted that the cable 37 is attached to the end of the main carriage remote from the drive drum. From its attachment to the drive drum the cable 37 passes behind the beam as seen in FIG. 1, around a sheave 41 attached to the associated end of the beam, and thence it is attached to the main carriage as shown at 42. Thus, upon clockwise rotation of the drive drum as viewed from above in FIG. 1, the cable 37 will wind onto the drive drum, tension the cable, which will result in the main carriage being drawn away from the drive drum, or to the left as viewed in FIG. 1. It will thus be seen that the main carriage is moved automatically from one extreme to the other by appropriate rotation of the drive drum, controlled by the reversing motor. Because of the positive connection of each cable at its respective ends, there is no possibility of slippage between cable and drum as would be the case where an intermediate portion of a single cable is merely wound about the drum.

To rotate the main agitator assembly, the main carriage is provided with a drum 43 mounted thereon between stringers 24 and 26 for rotation with axle 44 journaled in bearings 46. Fixed on the lower end of the axle is a support plate 47, formed with appropriate sockets as show best in FIG. 10, to receive the upper end portion 48 of main agitator paddle support rod 49. Rotation of the drum 43 is effected by a pair of cables 51 and 52. As shown best in FIGS. 2 and 3, the cable 51 is secured at one end to a flange 53 fixed on the drum intermediate its ends. The cable 52 is secured at one end the lower flange of the drum and is wound thereon in a direction opposite to the direction in which the cable 51 is wound. The other ends of the cables are attached to opposite ends of the beam as shown at 54 for the cable 51, and as shown at 56 for the cable 52. The attachment of each cable to the beam is adjustable to control tension in the cable, thus insuring no lost motion in the system. Because cleanliness of the apparatus is imperative the cables 51 and 52, and also the cables 36 and 37, are encased in a flexible sheath of an appropriate synthetic resin. This renders the cables easy to clean because it discourages sticking of ingredients thereto.

It will thus be seen that as the main carriage is drawn back and forth the cables 51 and 52 drive the drum 43, when viewed from above as in FIG. 2, counterclockwise when the main carriage is drawn to the right and clockwise when the main carriage is drawn to the left. Because each of the cables, including cables 36 and 37, are subject to independent adjustment for tension, it will be apparent that movement of the main carriage may be controlled within close limits.

Rotation of the drum 43 of course effects rotation of the main agitator support plate 47 and the agitator suspended thereon. The agitator support plate preferably supports four individual main agitator paddle assemblies as shown best in FIGS. 1, 16 and 17, each paddle assembly being removably or detachably supported on support plate 47 by the complementary locking portion 48 as previously discussed.

It is the function of the main agitator assembly to thoroughly agitate the ingredients within the vat by a combination of motion longitudinally of the vat and rotary motion as it moves from one end of the vat to the other. But mere agitation of the ingredients is not sufficient. It is also necessary to prevent the accumulation of ingredients which tend to stick to the bottom of the vat. Additionally, it should be remembered that both these functions must be performed for both directions of movement of the main carriage, with attendant reverse rotation of the main agitator assembly.

To accomplish the foregoing there are provided two different pairs of paddles in the main agitator assembly. One pair of paddles 61 (FIG. 1) are especially adapted to effect agitation, and each of these paddles comprises a flat metallic sheet bifurcated as shown to provide a generally U-shaped paddle having upwardly extending spaced arms 62 joined at their lower ends by a body portion 63. Each paddle is pivotally suppported on a crossbar 64 secured to the lower end of support rod 49. It will thus be apparent from FIG. 17 that each paddle is capable of pivotal movement through an arc sufficient to reverse its relationship with the support rod 49. To limit such pivotal movement a U-shaped bracket 66 is secured to each side of each paddle so as to abut against the support rod when the paddle has pivoted through the desired arc.

Pivotal movement of the paddle is effected by the ingredients within the vat and the direction of rotation of the agitator assembly. Thus, as seen in FIG. 1, the main carriage is shown at the extreme of its leftward movement. As discussed above, movement of the main carriage in this direction will result in clockwise rotation of the main agitator assembly. Such clockwise rotation of the main agitator will cause the ingredients to tip each paddle 61 back so that the bottom edge of the paddle will always be the leading edge of the paddle. The reason this occurs is because pivotal axis of the paddle is much closer to the bottom edge of the paddle, resulting in more total force being applied to the flat areas presented by the arms 62 than applied on the area of the paddle below the pivotal axis. Thus, from its position shown in FIG. 1, when the main carriage commences its movement to the right the paddles 61 will immediately flip into a reverse attitude. It will thus be apparent that a great deal of turbulence will be generated in the ingredients by rotation of the paddles therethrough.

But as explained above mere agitation is insufficient. The bottom of the vat should also be scraped to remove any ingredients which may tend to stick thereto. To accomplish such scraping action, the other pair of paddles on the main agitator assembly comprise oppositely disposed paddles 67 (FIG. 1), each of which includes a metallic sheet 68 having its lower leading edge in scraping contact with the bottom of the vat.

The scraper 68 is pivoted on one end of a lever 69, the other end of which is pivoted to the lower end of support rod 49 in a manner to orient the lever generally horizontal and substantially parallel to the bottom of the vat. As with the paddles 61, the pivotal connection 71 of the scraper with the lever occurs at a point closer to the bottom edge of the scraper than the top edge. As a result the scraper will tip upon rotation through the ingredients for the same reason explained above in conjunction with paddles 61 so that the bottome edge will always remain the leading edge. Appropriate stop means 72 are provided to limit pivotal movement of the scraper.

From the construction illustrated and described it will be apparent that when the scraper flips from its position shown in full lines to its position shown in broken lines, the pivotal center of the scraper will rise to a maximum height when the scraper is perpendicular to the bottom of the vat, and will then lower to its position shown. Such movement of the pivotal center is permitted by the level 69 which pivots on support rod 49 so as to accommodate such movement.

Because the main agitator assembly rotates in a circular path, there are pockets of ingredients adjacent each end of the vat principally in the corners, which are not agitated by the main agitator. Accordingly, auxiliary or terminal agitators are provided at opposite ends of the vat to effect turbulent displacement of the ingredients adjacent each end of the vat, and to scrape ingredients from the end walls of the vat.

Such auxiliary or terminal agitators are of different construction at opposite ends of the vat, with the terminal agitator at the left in FIG. 1, and shown in FIGS. 13 and 14 comprising a two-part blade 76, the two parts being joined by metal U-shaped straps 77 adapted to fit about a strainer structure 78 in the vat. Where no strainer is used, or where it does not project into the vat, a baffle blade 79 as shown at the right of FIG. 1 and in FIG. 15 may be used.

Each of the terminal agitator blades is pivotally supported at the lower end of an inverted U-shaped frame 81 having an extension 82 thereon symmetrical with respect to the arms of the frame 81, and serving to rotatably support a plurality of rollers 83 as shown.

To movably support the terminal agitators on the beam, a pair of auxiliary carriage frames 84 and 86 are provided rollably mounted on the beam. The auxiliary carriage frames are arranged to be moved simultaneously in the same direction by movement of the main carriage in the same direction. While in the embodiment chosen for illustration the auxiliary carriages are limited to longitudinal movement adjacent each associated end of the vat, it should be understood that if desired each auxiliary carriage could be arranged to move at least half the length of the vat.

Each auxiliary carriage frame (FIGS. 1, 5, 6 and 7) comprises upper and lower pairs of axles 87 and 88, respectively, rigidly joined by horizontal stringers 89 and vertical members 91 and 92. The vertical members 92 are arranged to form a track as shown within which the terminal agitator roller assembly 83 may move up and down. Two-part wheels 93 are journaled on the other ends of the axles are adapted to rollably and resiliently engage the flanges 18 on the beam as shown best in FIG. 7. As with the wheels 22 and 23 on the main carriage, the wheels 93 are preferably fabricated from a synthetic resinous material which discourages sticking of the ingredients thereto. The wheels are also fabricated in a manner to provide automatic compensation for wear.

Interconnecting the auxiliary carriage frames is a rod 94 (FIG. 5), adjustable at each end so as to selectively orient the auxiliary carriages one with the other and with other apparatus and devices supported on the beam. Movement is imparted to the auxiliary carriages by abutment of the main carriage against one or the other of the auxiliary carriages. For this purpose the main carriage is provided at each end with a bar 96 adapted to abut against the axles 87 and 88 of the auxiliary carriages during a portion of the travel of the main carriage from one extreme to another. Thus, as the main carriage moves toward each extreme of its travel, it abuts the auxiliary carriage toward which it is moving, which auxiliary carriage is at one extreme of its movement. This position of the carriages is illustrated in FIG. 1 in which the auxiliary carriage 84 is at one extreme of its movement while the auxiliary carriage 86 is also at one extreme of its movement. Their respective positions are distinguished however by the fact that the auxiliary carriage 84 is in abutting relation with the adjacent end wall 6 of the vat, while the auxiliary frame 86 is spaced from the associated end wall of the vat.

In the position of the auxiliary carriages 84 and 86 shown in FIG. 1, the terminal agitator plate 76 associated with auxiliary carriage 84 is resting against the bottom of the vat and abutting the end wall. The opposite terminal agitator plate 79 however is in elevated position and is spaced from the end wall. To effect reversal of these relationships, means are provided interposed between each auxiliary carriage and the beam to elevate one of the terminal agitator plates while lowering the other.

Pivotally supported on each auxiliary carriage is bar 97 pivoted at one end on axle 87 (FIGS. 5 and 6) and at its other end engaging the extension 82 of terminal agitator frame 81. A cam actuated toggle assembly (FIGS. 8 and 9) including a fixed link 98, a pivoted link 99 and a roller 101, is interposed between the auxiliary carriage frame and an intermediate portion of the bar 97. A cam follower 102 is secured to the pivoted link 99 so that as the auxiliary carriage, for instance auxiliary carriage 84, moves to the right in FIG. 1, the cam follower will strike a cam 103 (FIG. 8) fixed on the beam and cause the toggle to straighten out as shown in broken lines in FIG. 8. This causes the free end of bar 97 to pivot upwardly, elevating the terminal agitator assembly. As the toggle assumes its extended position, the cam follower passes over plate 104 fixed on the beam, which effectively locks the toggle in this extended position until the direction of movement of the auxiliary carriage frame is reversed (FIG. 9). It should be noted that elevation of each terminal agitator assembly occurs when each terminal agitator and auxiliary carriage approaches a predetermined distance from the associated end wall of the vat.

Reversing the direction of movement of the auxiliary carriage (FIG. 9) so as to bring each terminal agitator into close proximity with the end wall causes the cam follower 102 to come into contact with a second cam roller 106 which depresses the cam follower 102 to cause buckling of the toggle with attendant lowering of the terminal agitator assembly. Thus, by this means, as the main carriage assembly automatically reciprocates on the beam, each terminal agitator is raised and lowered automatically at precisely the appropriate time to effect scraping of the end of the vat to free ingredients adhering thereto and to insure placement of the terminal agitator baffle or plate precisely in the corner between the end and bottom of the vat.

In the modified embodiment of the main agitator assembly shown in FIGS. 10, 11 and 12, an auxiliary pusher blade 107 is secured to the lower end of a frame 108, the upper end of which is journaled on a bracket 109 depending from the main carriage frame. A stop bracket 112 is provided to limit pivotal movement of the blade in one direction while permitting it to pivot freely in the opposite direction. The lower end of the blade rests lightly on the bottom so that as the main carriage moves toward one end of the vat, the blade 107 pushes a mass of the ingredients toward the auxiliary carriage agitator means, thus insuring complete agitation of the mixture. As the main carriage moves away from the associated end of the vat the pusher blade 107 will tend to be pivoted out of the mixture by resistance of the ingredients.

In summary, it will be apparent from the above that reciprocal translation of the main carriage and agitator assembly is accompanied by corresponding reciprocal movement of the auxiliary carriages, with their attendant terminal agitators. The great mass of ingredients in the vat is thus thoroughly agitated and mixed by the main agitator, while pockets of quiescent ingredients trapped in corners are avoided.

While the invention has been described and illustrated in an embodiment particularly applicable to the manufacture of cheeses, it will be apparent to those skilled in the art that the apparatus and method is not limited to use in the processing of cheeses but may be used in any application where thorough mixing of liquidus ingredients is desired.

I claim:

1. In an apparatus for processing cheeses and including a vat for containing the ingredients of the cheese, apparatus for agitating and mixing the ingredients to maintain a substantially uniform temperature throughout the mass of ingredients and to prevent adherence of such ingredients to each other in the vat comprising:
   (a) a carriage beam supported on the vat,
   (b) main carriage means movably supported for translation along the beam and including agitator paddle means depending from the main carriage means into the vat and movable to stir the ingredients in the vat and to scrape the bottom of the vat to prevent adherence of the ingredients to each other and to the vat upon translation of the main carriage means along the beam,
   (c) auxiliary carriage means movably supported for translation along the beam and including agitator paddle means depending from the auxiliary carriage into the vat and movable to stir the ingredients in the vat and to scrape the ends of the vat to prevent adherence of the ingredients thereto and to each other upon translation of the auxiliary carriage along the beam, and
   (d) means cooperatively interconnecting said main and auxiliary carriage means to effect selective translation of each carriage means along the beam within predetermined limits.

2. The combination according to claim 1, in which translation of the main carriage in one direction beyond a predetermined limit effects translation of the auxiliary carriage in the same direction, and translation of the main carriage in the opposite direction beyond a predetermined limit effects translation of the auxiliary carriage in a corresponding direction.

3. The combination according to claim 1, in which a pair of auxiliary carriage means are provided, one each of said pair disposed on opposite sides of the main carriage means.

4. The combination according to claim 3, in which said vat is an elongated rectangular container, said beam extends longitudinally over the vat, said main carriage means is translatable over an intermediate portion of the beam and said auxiliary carriage means are translatable over opposite end portions of the beam.

5. The combination according to claim 3, in which translation of said main carriage and one of said auxiliary carriages in unison and in a first direction is effected by abutment means on the main carriage abutting against the auxiliary carriage prior to completion of translation by the main carriage means.

6. The combination according to claim 1, in which means are provided operatively associated with the auxiliary carriage means to effect raising and lowering the associated paddle means upon translation of the auxiliary carriage means along the beam.

7. The combination according to claim 6, in which said means to effect raising and lowering of said paddle means comprises a lever pivoted at one end on the auxiliary frame and at its other end connected to said paddle means, and a toggle mechanism on the auxiliary carriage responsive to longitudinal movement thereof along the beam to raise and lower the end of said lever connected to the paddle means.

8. The combination according to claim 1, in which said main carriage means includes drive means for rotating said paddle means upon longitudinal translation of the main carriage means along the beam.

9. The combination according to claim 8, in which said drive means for rotating said main carriage paddle assembly comprises a cable drum rotatably supported on the main carriage means, a rotatable shaft depending from said cable drum, and a support plate fixed on said shaft for rotation therewith and on which said paddle assembly is detachably supported.

10. The combination according to claim 1, in which said means cooperatively interconnecting said main and auxiliary carriage means comprises a first cable drum rotatably disposed on the main carriage means, a second cable drum rotatably disposed on the vat adjacent one end of the beam, a pair of cables operatively interposed between said drums and having corresponding ends anchored adjacent opposite ends of the beam whereby rotation of said second drum in one direction effects longitudinal translation of the main carriage means in one direction while rotation of said second drum in the opposite direction effects longitudinal translation of the main carriage means in the opposite direction, and means cooperatively associated with said main and auxiliary carriages whereby translation of both said carriages in the same direction is effected during a portion of the translation of the main carriage means along the beam.

11. The combination according to claim 1, in which means are provided to raise the paddle means on the auxiliary carriage means prior to the completion of its translation in one direction and lower the paddle means at the completion of translation of the auxiliary carriage means in the one direction.

12. The combination according to claim 1, in which deflector means are provided pivotally supported on the paddle means depending from said main carriage means and automatically movable into a deflecting position upon movement of the paddle means through the ingredients in the vat.

References Cited by the Examiner

UNITED STATES PATENTS

| 1,982,715 | 12/34 | Whiteside | 259—102 |
| 2,488,053 | 11/49 | Damrow | 31—48 |
| 2,617,191 | 11/52 | Detjen | 31—48 |
| 2,774,140 | 12/56 | Nessler et al. | 31—48 |
| 3,102,336 | 9/63 | Collins | 31—48 |

SAMUEL KOREN, *Primary Examiner.*

ALDRICH F. MEDBERY, *Examiner.*